(12) United States Patent
Dyer et al.

(10) Patent No.: US 11,779,114 B2
(45) Date of Patent: Oct. 10, 2023

(54) ADJUSTIBLE CENTER POST FOR MULTI-DOOR ENCLOSURES

(71) Applicant: S&C Electric Company, Chicago, IL (US)

(72) Inventors: Thomas J Dyer, Minneola, FL (US); Joseph W Milton, Milwaukee, WI (US)

(73) Assignee: S&C Electric Company, Chicago, IL (US)

( * ) Notice: Subject to any disclaimer, the term of this patent is extended or adjusted under 35 U.S.C. 154(b) by 104 days.

(21) Appl. No.: 17/489,956

(22) Filed: Sep. 30, 2021

(65) Prior Publication Data

US 2022/0104619 A1    Apr. 7, 2022

Related U.S. Application Data

(60) Provisional application No. 63/086,213, filed on Oct. 1, 2020.

(51) Int. Cl.
| | |
|---|---|
| *A47B 96/14* | (2006.01) |
| *A47B 45/00* | (2006.01) |
| *H02B 1/01* | (2006.01) |

(52) U.S. Cl.
CPC .......... *A47B 96/1425* (2013.01); *A47B 45/00* (2013.01); *H02B 1/012* (2013.01); *A47B 2220/0002* (2013.01)

(58) Field of Classification Search
CPC ......... A47B 45/00; A47B 47/00; A47B 47/02; A47B 47/027; A47B 47/028; A47B 96/14;

(Continued)

(56) References Cited

U.S. PATENT DOCUMENTS 5,086,930 A * 2/1992 Saeks ...................... B62H 3/12
248/161
6,431,668 B1   8/2002 Reddicliffe
(Continued)

FOREIGN PATENT DOCUMENTS

CN         204046972 U      12/2014
EP         2772155 A1 *     9/2014   ............. A47B 45/00
(Continued)

OTHER PUBLICATIONS

International Search Report and Written Opinion for International Application No. PCT/US2021/052767 dated Dec. 28, 2021. (8 pages).

*Primary Examiner* — Andrew M Roersma

(57) ABSTRACT

A center post assembly for eliminating sagging of a roof panel in a cabinet, where doors of the cabinet latch to the post assembly. The post assembly includes a base portion and a post portion, where one of the base portion or the post portion includes a plurality of slots and the other one of the base portion or the slot portion includes a plurality of threaded studs. The base portion further includes a first bracket and a jackscrew threaded into a threaded opening in the first bracket and the post portion further includes a second bracket, where the jackscrew engages the second bracket so that rotation of the jackscrew causes the second bracket to move relative to the first bracket so that the studs slide in the slots and increase the length of the post assembly to remove the sag.

19 Claims, 2 Drawing Sheets

(58) Field of Classification Search
CPC ............ A47B 96/1425; A47B 96/1433; A47B 96/145; A47B 2220/0002; H02B 1/012
See application file for complete search history.

(56) References Cited

U.S. PATENT DOCUMENTS

| | | | |
|---|---|---|---|
| 8,955,927 B2 * | 2/2015 | Fritz | H05K 7/183 403/70 |
| 11,432,429 B2 * | 8/2022 | Hinojosa | H05K 7/183 |
| 2018/0139859 A1 * | 5/2018 | Reese | H05K 7/18 |
| 2021/0033127 A1 | 2/2021 | Ricke | |

FOREIGN PATENT DOCUMENTS

| | | | | |
|---|---|---|---|---|
| FR | 2623064 A1 * | 5/1989 | ............ | A47B 57/54 |
| WO | 2017/106366 A1 | 6/2017 | | |

\* cited by examiner

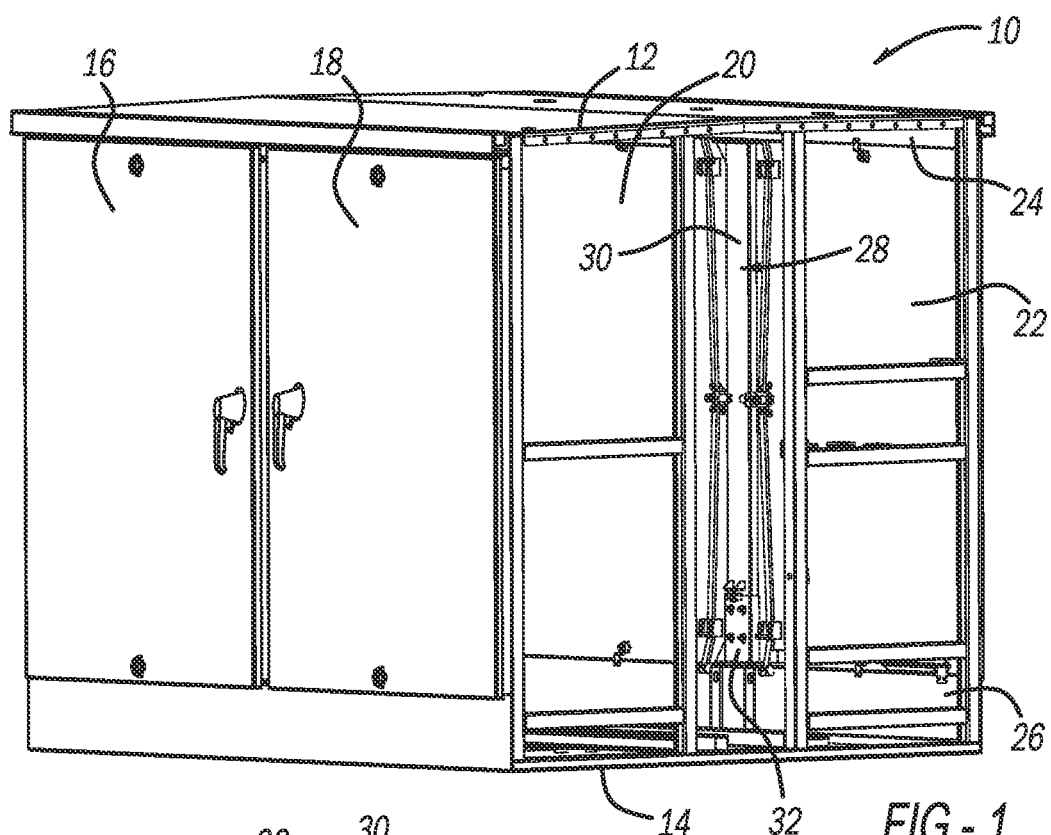
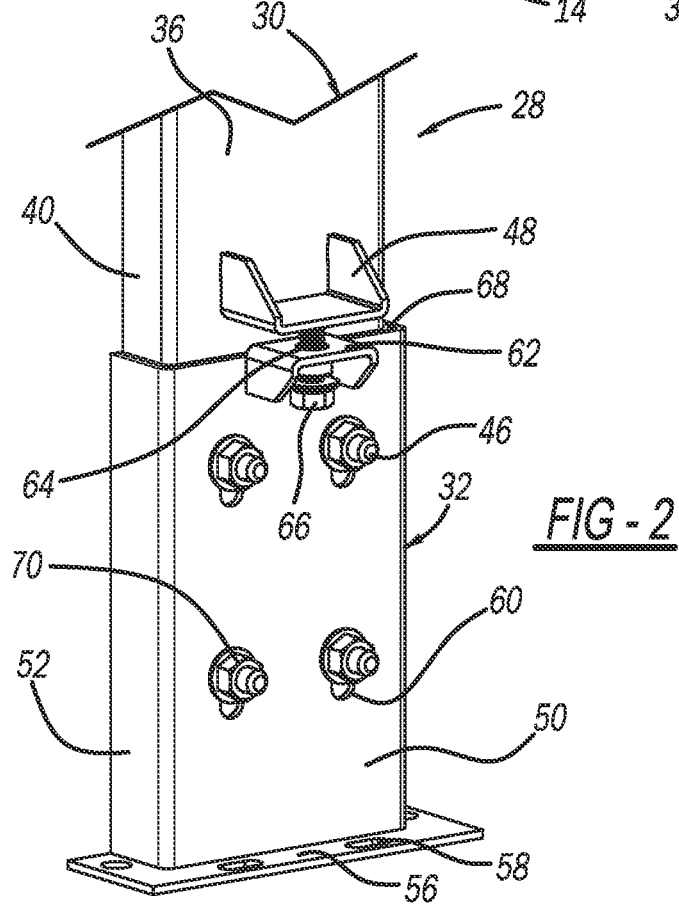

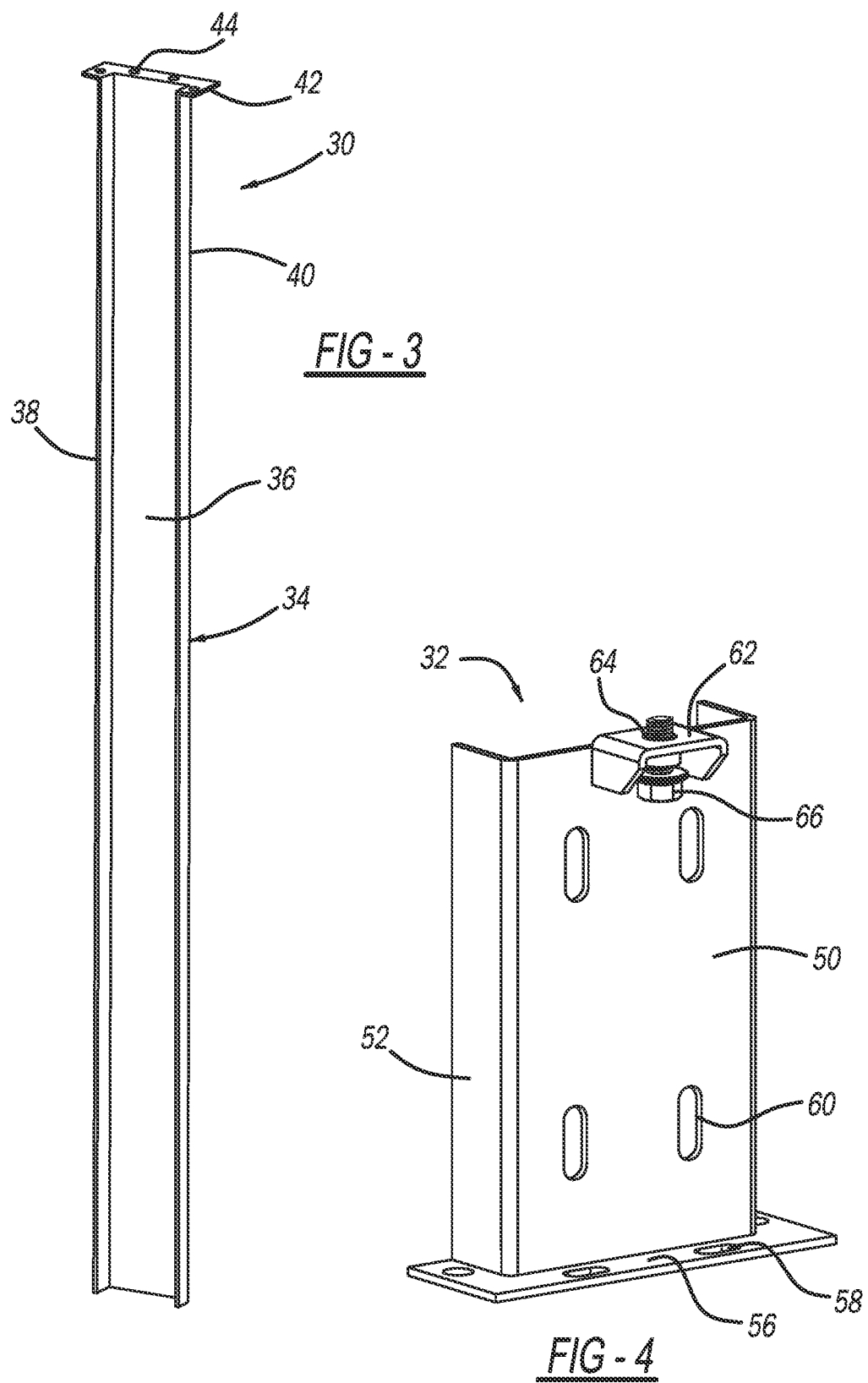

US 11,779,114 B2

ADJUSTIBLE CENTER POST FOR MULTI-DOOR ENCLOSURES

CROSS-REFERENCE TO RELATED APPLICATION

This application claims the benefit of priority from the U.S. Provisional Application No. 63/086,213, filed on Oct. 1, 2020, the disclosure of which is hereby expressly incorporated herein by reference for all purposes.

BACKGROUND

Field

This disclosure relates generally to a center post for supporting a top panel of a cabinet and, more particularly, to an adjustable center post assembly for supporting and eliminating sag of a top panel of a cabinet, where double doors of the cabinet are latched to the center post assembly, and where the center post assembly includes a base portion and a post portion slidably inserted into the base portion to provide an adjustable height.

Discussion of the Related Art

An electrical power distribution system, often referred to as an electrical grid, typically includes a vast network of power lines for delivering power to a number of loads, such as homes, businesses, etc. These power distribution systems employ many types and varieties of equipment, components, devices, etc., for example, switchgear, transformers, etc. Often times these components are housed in large metal cabinets and other types of enclosures that have a large front opening, for example, four to six feet wide, covered by two doors to allow access to the components therein. For some of these cabinets, a center post is mounted in the opening to provide a structure for latching the doors thereto and provide a support for preventing a top panel of the cabinet from sagging, which otherwise would prevent the doors from properly latching. However, the techniques for mounting these posts in the door opening during cabinet assembly can often be challenging because the top part of the door opening that is sagging needs to be lifted so that the post is able to fit therein. Various processes requiring prying tools and the like are known to be used to raise the sagging roof of the cabinet to install the post. However, because of the size and weight of the cabinet, these processes require significant force, and often more than one person, thus making them labor intensive.

SUMMARY

The following discussion discloses and describes an adjustable center post assembly for eliminating sagging of a roof panel in a cabinet, where the center post assembly is positioned at or near a center of a door opening in the cabinet, and where doors of the cabinet latch to the post assembly. The post assembly includes a base portion and a post portion, where one of the base portion or the post portion includes a plurality of slots and the other one of the base portion or the slot portion includes a plurality of threaded studs. The base portion further includes a first bracket and a jackscrew threaded into a threaded opening in the first bracket and the post portion further includes a second bracket, where the jackscrew engages the second bracket so that rotation of the jackscrew causes the second bracket to move relative to the first bracket so that the studs slide in the slots and increase the length of the post assembly to remove the sag.

Additional features of the disclosure will become apparent from the following description and appended claims, taken in conjunction with the accompanying drawings.

BRIEF DESCRIPTION OF THE DRAWINGS

FIG. 1 is an isometric view of a cabinet for housing electrical equipment including opposing doors at a front and back of the cabinet and an adjustable height center post assembly between the doors;

FIG. 2 is a broken-away isometric view of the center post assembly separated from the cabinet shown in FIG. 1;

FIG. 3 is an isometric view of a post portion of the center post assembly shown in FIG. 2; and FIG. 4 is an isometric view of a base portion of the center post assembly shown in FIG. 2.

DETAILED DESCRIPTION OF THE EMBODIMENTS

The following discussion of the embodiments of the disclosure directed to an adjustable center post assembly for supporting a top panel of a cabinet that encloses electrical equipment, where the post assembly includes a base portion and a post portion slidably inserted into the base portion, is merely exemplary in nature, and is in no way intended to limit the disclosure or its applications or uses. For example, the center post assembly is described herein as being applicable for cabinets that house electrical equipment. However, as will be appreciated by those skilled in the art, the post assembly may have application for other types of cabinets.

FIG. 1 is an isometric view of a cabinet 10 that is configured to house and hold electrical equipment of various types, none of which is shown, where a side panel of the cabinet 10 has been removed to expose the interior of the cabinet 10. The cabinet 10 includes a top panel 12, a bottom panel 14, a pair of opposing doors 16 and 18 at a front of the cabinet 10 and a pair of opposing doors 20 and 22 at a rear of the cabinet 10. The removed side panel shows a center post assembly 28 between the rear doors 20 and 22 to which the doors 20 and 22 are latched in any normal and known manner, where a top end of the post assembly 28 is secured to a top rail 24 extending along the top panel 12 and a bottom end of the post assembly 28 is secured to a bottom rail 26 extending along the bottom panel 14. The doors 16 and 18 would also be latched to a similar center post assembly (not shown). It is noted that the cabinet 10 is shown merely for illustrative purposes in that the center post assembly 28 is applicable to be used in connection with other cabinets of other sizes and shapes including cabinets having only one pair of opposing doors. Similarly, there may be a number of different ways that the center post assembly 28 is connected to the cabinet 10 depending on the specific cabinet construction, where the adjustability of the center post assembly 28 is not specific to any single type of cabinet construction or center post attachment process.

FIG. 2 is a broken-away isometric view of the center post assembly 28 separated from the cabinet 10. The assembly 28 includes a metal post portion 30, shown separated from the assembly 28 in FIG. 3, and a U-shaped metal base portion 32, shown separated from the assembly 28 in FIG. 4. The post portion 30 includes a U-shaped elongated portion 34 having a back panel 36, opposing side panels 38 and 40 and a top mounting flange 42 including bolt holes 44 for securing the center post assembly 28 to the top rail 24 of the cabinet 10. It is noted that the U-shape cross-section of the base portion 32 and the elongated portion 34 is merely for illustration purposes in that the base portion 32 and the elongated portion 34 can have other cross-sectional shapes, such as a box beam. It is further noted that the use of the flange 42 is one exemplary technique for attaching the center post assembly 28 to the cabinet 10. A number of threaded studs 46, here four, are secured to the back panel 36 at an end opposite from the flange 42 and a U-shaped bracket 48 is attached to and extends from the back panel 36 proximate and above the studs 46. The base portion 32 includes a back panel 50, opposing side panels 52 and a bottom mounting flange 56 including bolt holes 58 for securing the center post assembly 28 to the bottom rail 26 of the cabinet 10. It is noted that the use of the flange 56 is one exemplary technique for attaching the center post assembly 28 to the cabinet 10. The back panel 50 includes a number of slots 60, here four, that are configured to align with the studs 46. It is noted that in other designs, the post portion 30 can have the slots and the base portion 32 can have the studs. A U-shaped bracket 62 is attached to and extends from the back panel 50 proximate and above the slots 60, where the bracket 62 includes a threaded opening 64. A jackscrew 66 is threaded into the opening 64 and engages the bracket 48. A gasket material 68 is provided between the post portion 30 and the base portion 32 for weather sealing purposes.

For one assembly technique, the gasket material 68 is first placed in the base portion 32. The end of the elongated portion 34 opposite to the flange 42 is inserted into and between the panels 52 so that each of the studs 46 is inserted into one of the slots 60 and the brackets 48 and 62 contact each other or the bracket 48 contacts the jackscrew 66. Nuts 70 are loosely threaded onto the studs 46 so that the base portion 32 and the post portion 30 are attached but can easily slide relative to each other. The post assembly 28 is then inserted into the opening in the cabinet 10 and the flange 42 is bolted to the top rail 24. The base portion 32 and the post portion 30 are slid apart where the studs 46 slide in the slots 60 so that the base portion 32 contacts the bottom rail 26 and the flange 56 is bolted to the bottom rail 26. The jackscrew 66 is rotated so that it pushes up against the bracket 48 so that the post portion 30 is raised in the base portion 32 and the post assembly 28 lengthens so as to remove the sag in the top panel 12 and the top rail 24 to make them level so that the doors 20 and 22 can be properly latched, where any suitable type of indicia or measurement can be used to identify the desired length of the post assembly 28. The nuts 70 are then tightened onto the studs 46 to firmly secure the post portion 30 to the base portion 32 at the desired location so that the post assembly 28 is properly sized in length for the distance between the top panel 12 and the bottom panel 14.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A post assembly for eliminating sagging of a roof panel in a cabinet, said post assembly comprising a base portion and a post portion, where a first of the base portion or the post portion includes a plurality of slots and a second one of the base portion or the slot portion includes a plurality of threaded studs, wherein each one of the studs is inserted into one of the slots, said base portion further including a first bracket and a jackscrew threaded into a threaded opening in the first bracket and said post portion further including a second bracket, wherein the jackscrew engages the second bracket so that rotation of the jackscrew causes the second bracket to move relative to the first bracket so that the studs slide in the slots and increase a length of the post assembly to remove the sag.

2. The post assembly according to claim 1 wherein the base portion and the post portion have a U-shaped cross-section, and wherein the post portion is slid into the base portion.

3. The post assembly according to claim 1 wherein a bottom end of the base portion includes a flange for securing the post assembly to the cabinet at one end and a top end of the post portion includes a flange for securing the post assembly to the cabinet at an opposite end.

4. The post assembly according to claim 1 further comprising a gasket material positioned between the base portion and the post portion.

5. The post assembly according to claim 1 wherein the base portion includes the slots and the post portion includes the studs.

6. The post assembly according to claim 1 further comprising nuts that are threaded onto the studs to secure the post portion to the base portion.

7. The post assembly according to claim 1 wherein the cabinet is configured to hold electrical equipment.

8. A cabinet comprising opposing side panels, a top panel and a bottom panel, said cabinet further comprising a top rail and a bottom rail defining a door opening, a pair of opposing doors pivotally mounted to the cabinet and a center post assembly extending across the opening, said post assembly including a base portion having a plurality of slots and a post portion including a plurality of threaded studs, where each one of the studs is inserted into one of the slots, said base portion further including a first bracket and a jackscrew threaded into a threaded opening in the first bracket and said post portion further including a second bracket, wherein the jackscrew engages the second bracket so that rotation of the jackscrew causes the second bracket to move relative to the first bracket so that the studs slide in the slots and increase a length of the post assembly to remove sag in the top panel.

9. The cabinet according to claim 8 wherein the base portion and the post portion have a U-shaped cross-section, and wherein the post portion is slid into the base portion.

10. The cabinet according to claim 8 wherein a bottom end of the base portion includes a flange for securing the post assembly to the cabinet at one end and a top end of the post portion includes a flange for securing the post assembly to the cabinet at an opposite end.

11. The cabinet according to claim 8 further comprising a gasket material positioned between the base portion and the post portion.

12. The cabinet according to claim 8 wherein the base portion includes four said slots and the post portion includes four said studs.

13. The cabinet according to claim 8 further comprising nuts that are threaded onto the studs to secure the post portion to the base portion.

14. The cabinet according to claim 8 wherein the cabinet is configured to hold electrical equipment.

15. A center post assembly for eliminating sagging of a roof panel in a cabinet, said post assembly being positioned at or near a center of a door opening in the cabinet, wherein doors of the cabinet latch to the post assembly, said post assembly comprising a base portion including a plurality of slots and a post portion including a plurality of threaded studs, where each one of the studs is inserted into one of the slots, said base portion further including a first bracket and a jackscrew threaded into a threaded opening in the first bracket and said post portion further including a second bracket, wherein the jackscrew engages the second bracket so that rotation of the jackscrew causes the second bracket to move relative to the first bracket so that the studs slide in the slots and increase a length of the post assembly to remove the sag.

16. The post assembly according to claim 15 wherein a bottom end of the base portion includes a flange for securing the post assembly to the cabinet at one end and a top end of the post portion includes a flange for securing the post assembly to the cabinet at an opposite end.

17. The post assembly according to claim 15 further comprising a gasket material positioned between the base portion and the post portion.

18. The post assembly according to claim 15 wherein the base portion includes four said slots and the post portion includes four said studs.

19. The post assembly according to claim 15 further comprising nuts that are threaded onto the studs to secure the post portion to the base portion.

* * * * *